(12) United States Patent
Ferguson et al.

(10) Patent No.: US 7,727,501 B2
(45) Date of Patent: Jun. 1, 2010

(54) COMPACTED GRANULAR POTASSIUM CHLORIDE, AND METHOD AND APPARATUS FOR PRODUCTION OF SAME

(75) Inventors: Del Ferguson, Regina (CA); Rob Plosz, Hersey, MI (US); Annette Revet, Regina (CA); Doug LaRocque, Regina (CA); Peter Jackson, Regina (CA); Carey Heinbigner, Regina (CA); Dave Zirk, Regina (CA); Scott St. Germaine, Hersey, MI (US)

(73) Assignee: The Mosaic Company, Plymouth, MN (US)

( * ) Notice: Subject to any disclaimer, the term of this patent is extended or adjusted under 35 U.S.C. 154(b) by 1280 days.

(21) Appl. No.: 10/838,178

(22) Filed: May 3, 2004

(65) Prior Publication Data

US 2005/0036929 A1 Feb. 17, 2005

Related U.S. Application Data

(60) Provisional application No. 60/494,142, filed on Aug. 11, 2003.

(51) Int. Cl.
C01D 3/04 (2006.01)
C01D 3/22 (2006.01)

(52) U.S. Cl. .................. 423/266; 423/274; 423/275; 423/499.1; 264/176.1; 264/210.1; 264/210.6

(58) Field of Classification Search .......... 423/499.1, 423/266, 267, 274, 275; 264/176.1, 210.1, 264/210.6
See application file for complete search history.

(56) References Cited

U.S. PATENT DOCUMENTS

| | | | |
|---|---|---|---|
| 2,016,274 A | | 10/1935 | Boughton |
| 2,470,822 A | | 5/1949 | Johson et al. |
| 2,685,438 A | | 8/1954 | Cross |
| 2,703,272 A | | 3/1955 | Fuchsman |
| 3,378,489 A | | 4/1968 | Lasater |
| 3,466,161 A | | 9/1969 | Perlmutter et al. |
| 3,653,847 A | | 4/1972 | Abelson |
| 3,711,254 A | | 1/1973 | McGowan et al. |
| 3,891,397 A | | 6/1975 | Fiedelman |
| 4,385,920 A | * | 5/1983 | Dancy et al. ............... 71/36 |
| 4,486,217 A | * | 12/1984 | Arai et al. .................. 71/25 |
| 4,560,400 A | | 12/1985 | Allan et al. |

(Continued)

FOREIGN PATENT DOCUMENTS

DE 3215735 4/1982

(Continued)

OTHER PUBLICATIONS

Perry et al, "Chemical Engineers' Handbook", Fifth edition, pp. 8-57 through 8-65, 1973.*

*Primary Examiner*—Ngoc-Yen M Nguyen
(74) *Attorney, Agent, or Firm*—Patterson Thuente Christensen Pedersen P.A.

(57) ABSTRACT

Apparatus and method are disclosed for the production of compacted granular potassium chloride with improved handling qualities. A binding ingredient such as sodium hexametaphosphate is blended with the potassium chloride feed material in advance of compaction. The product of this apparatus and method has improved handling, storage, strength and other qualities over compacted granular potassium produced using prior art methods.

7 Claims, 6 Drawing Sheets

U.S. PATENT DOCUMENTS

| | | | |
|---|---|---|---|
| 5,073,377 A * | 12/1991 | Alexander et al. | 424/458 |
| 5,085,670 A | 2/1992 | Quencer | |
| 5,383,952 A * | 1/1995 | Singewald et al. | 71/63 |
| 5,460,765 A | 10/1995 | Derdall et al. | |
| 5,545,394 A | 8/1996 | Doxsee | |
| 6,013,209 A | 1/2000 | Phinney | |
| 6,132,484 A | 10/2000 | Phinney | |
| 6,299,663 B1 | 10/2001 | Phinney | |
| 6,582,637 B1 | 6/2003 | Phinney | |
| 6,749,660 B2 * | 6/2004 | Hince | 71/31 |
| 2004/0096557 A1 * | 5/2004 | Kelly et al. | 426/512 |

FOREIGN PATENT DOCUMENTS

| | | |
|---|---|---|
| DE | 251124 | 11/1989 |
| DE | 3825434 | 11/1989 |
| DE | 19902395 | 5/2001 |
| EP | 0964303 | 12/1999 |
| EP | 1048634 | 11/2000 |
| EP | 1219581 | 7/2002 |
| WO | WO 92/21732 | 12/1992 |

* cited by examiner

COMPACTED GRANULAR POTASSIUM CHLORIDE, AND METHOD AND APPARATUS FOR PRODUCTION OF SAME

REFERENCE TO RELATED APPLICATION

This application claims priority to U.S. Provisional Application No. 60/494,142 filed Aug. 11, 2003, which is hereby incorporated by reference.

FIELD OF THE INVENTION

This invention is in the field of mineral extraction and production, and more particularly deals with a method and apparatus for the production of compacted granular potassium chloride.

BACKGROUND OF THE INVENTION

Potassium chloride ("potash") has many industrial uses, but is most commonly known as a component of agricultural fertilizers. Potash is typically extracted from underground sources either by conventional mining techniques or by solution mining. Once extracted, potassium chloride can be processed into a number of different finished forms or products suitable for specific industrial, chemical or agricultural applications as desired by individual customers.

Finished potassium chloride is typically sold in a granular form, and the purity and granule size may vary depending on the end use to which the product will be put. The grading of potash, and hence its market value are also dependent on both the purity and granule size of the product. Typically the potassium chloride is screened to the desired particle size for a particular need.

A typical potassium chloride feed stock, has a granule size that is comparable to table salt, which is less than the desired granule size. In order to obtain larger granules, this feedstock is first compacted using a simple roll compacter or the like to produce a sheet-like product. Subsequent processing typically involves controlled breakage of the potassium chloride sheet into granules, which are then sorted to a desired size range by screening or other methods known in the industry.

However, one of the limitations with compacted granular potassium chloride produced in this fashion has been that the product will physically break down when handled, stored or shipped. Given that granule size is an important feature in the finished product, breakage therefore diminishes the value of the finished product. These broken granules that arise from the handling of the finished product during processing are known as recycle or reclaim material. Such broken granules are collected or reclaimed from various areas during processing and can be mixed back into the feedstock and compacted again.

After the finished product leaves the plant, breakage diminishes the value of the product. Broken granules are smaller than the desired size and cause problems during the storage and handling of the finished product due to a tendency to generate dust and form clumps, a property known as "bridging." Bridging impedes the flow of the product, and may result in significant storage problems. Excessive dust causes environmental concerns while uneven granule size can directly affect application rates.

Shipping of potash, typically by rail, is not a gentle process either in terms of the handling involved in the loading of rail cars or mechanical agitation during the extended movement of the rail cars themselves. Thus, storage, shipping and handling after the potash has left the mill can break up granules, with the result that over time undesirable characteristics occur in the product.

Therefore, it has been the desire of those in the field to find methods of producing an improved compacted granular potassium chloride product, with better shipping, handling and storage characteristics as compared to compacted potash products manufactured using prior art methods. Methods of production that improve the handling characteristics of compacted potash products and which result in a more durable finished product are of value as the result will be a more desirable and saleable commodity.

SUMMARY OF THE INVENTION

It is the object of the present invention to produce an improved compacted granular potassium chloride product with improved handling qualities.

More specifically, it is the object of the present invention to provide a method and apparatus for the production of an improved compacted granular potassium chloride product that is less likely to break down during handling, transport or long-term storage.

The invention accomplishes this objective by the addition of a binding ingredient to the potassium chloride feed material in advance of the compaction step in a compaction feed process or production circuit. Addition of an effective amount of sodium hexametaphosphate (SHMP) as a binding ingredient to the potassium chloride feed material in advance of compaction yields a compacted granular potassium chloride with better handling or storage qualities.

SHMP is operative to sequester moisture, calcium and magnesium and glue the product together and thus it will be understood by persons skilled in the art that binding ingredients other than SHMP will accomplish the same objectives. Therefore, the substitution or incorporation of such alternative binding ingredients into the process or product of the present invention is intended to be encompassed within the scope by the present invention.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE PREFERRED EMBODIMENTS

The invention is a method and apparatus for the production of a compacted granular potassium chloride product with improved handling and storage capabilities, as well as the product of this method and apparatus. It is necessary to produce a compacted granular potassium chloride product comprising stronger finished particles that are less likely to break down during handling, transport or storage.

Addition of a Chemical Binding Agent

In order to improve the strength or handling ability of the finished potassium chloride granular product it is necessary to produce granules which are less likely to wear or break down during handling or transport. The present invention combines a chemical binding ingredient or binding agent with the potassium chloride feed material in the compaction feed process circuit to yield this improved product.

A binding agent is a chemical that is added into the feed of a compaction circuit to improve the strength and quality of compacted particles. Such binding agents have been used on certain circumstances in the production of other granular materials such as sodium chloride. However, chemical binding agents have not been used in the processing of a potassium chloride feed into a compacted granular product. According to the method of the present invention, an effective amount of the binding agent sodium hexametaphosphate (SHMP) is added to the potassium chloride feedstock in advance of compaction, to yield a finished potassium chloride granular product with improved handling and storage capabilities.

Chemically, SHMP is known to sequester moisture. When blended in a potassium chloride granular product SHMP will prevent moisture from migrating out of the compacted particle. When moisture migrates out of a particle, it tends to become more fragile and breaks down with handling, or during storage or transport.

Impurities in potash, such as calcium and magnesium, are known in the art to increase the fragility of a potassium chloride product. The additional property of SHMP to chelate calcium and magnesium, thus also produces the desired effect of keeping the granule more stable. SHMP also has adhesive properties when blended in a potassium chloride product, and thus acts literally hold the particle together. This adhesive property makes the particle stronger and allows the particle to stand up to storage, shipping and handling much better than does potassium chloride produced without SHMP as an additive.

Other binding ingredients which will accomplish the same result of sequestering moisture in the compacted potassium chloride particles and/or generally acting as an adhesive to help those particles to maintain their shape and handling with minimized breakage during storage, handling or transport, are also contemplated within the scope of the present invention. Some of the alternate binding agents contemplated within the scope of the present invention include tetra-sodium pyrophosphate (TSPP), tetra-potassium pyrophosphate (TKPP); sodium tri-polyphosphate (STPP); di-ammonium phosphate (DAP), mono-ammonium phosphate (MAP), granular mono-ammonium phosphate (GMAP), potassium silicate, sodium silicate, starch, dextran, lignosulfonate, bentonite, montmorillonite, kaolin and others.

It will be understood that binding agents which accomplish the objective of sequestering moisture, sequestering calcium and magnesium or improving adhesion in the finished compacted potassium chloride granular product are contemplated within the scope of the present invention. Furthermore, one or more binding agents might be used, and the effective amounts of each used might be varied, depending upon the nature of the potassium chloride feedstock material and the desired finished product.

Method of Production

The method of the present invention, namely blending an effective amount of a binding agent such as SHMP into the potassium chloride feed of a compaction circuit, comprises the addition of said effective amount of a binding agent to a feedstock of the compaction circuit in advance of compaction. Compacting this blended potassium chloride feed stock and then conventional further processing completes the modified method of production contemplated herein.

It will be understood to those skilled in the art that many types of equipment or equipment modifications could be used in different production environments to implement or accomplish the method of the present invention. The basic requirement is to add an injector of some type to add a binding agent such as SHMP to the potassium chloride feedstock in advance of compaction.

A typical prior art production line or production circuit for compacted granular potassium chloride would consist of a material feed apparatus such as a belt conveyor, pneumatic conveyor or the like which input various particulate potassium chloride streams, screenings, or recovered or discarded potassium chloride material to a compactor. The purpose of the compactor is to press the feed material into a compacted potassium chloride intermediate sheet or cake, which can then be crushed, resized or otherwise refinished into a desired finished potassium chloride product.

Figure 1:
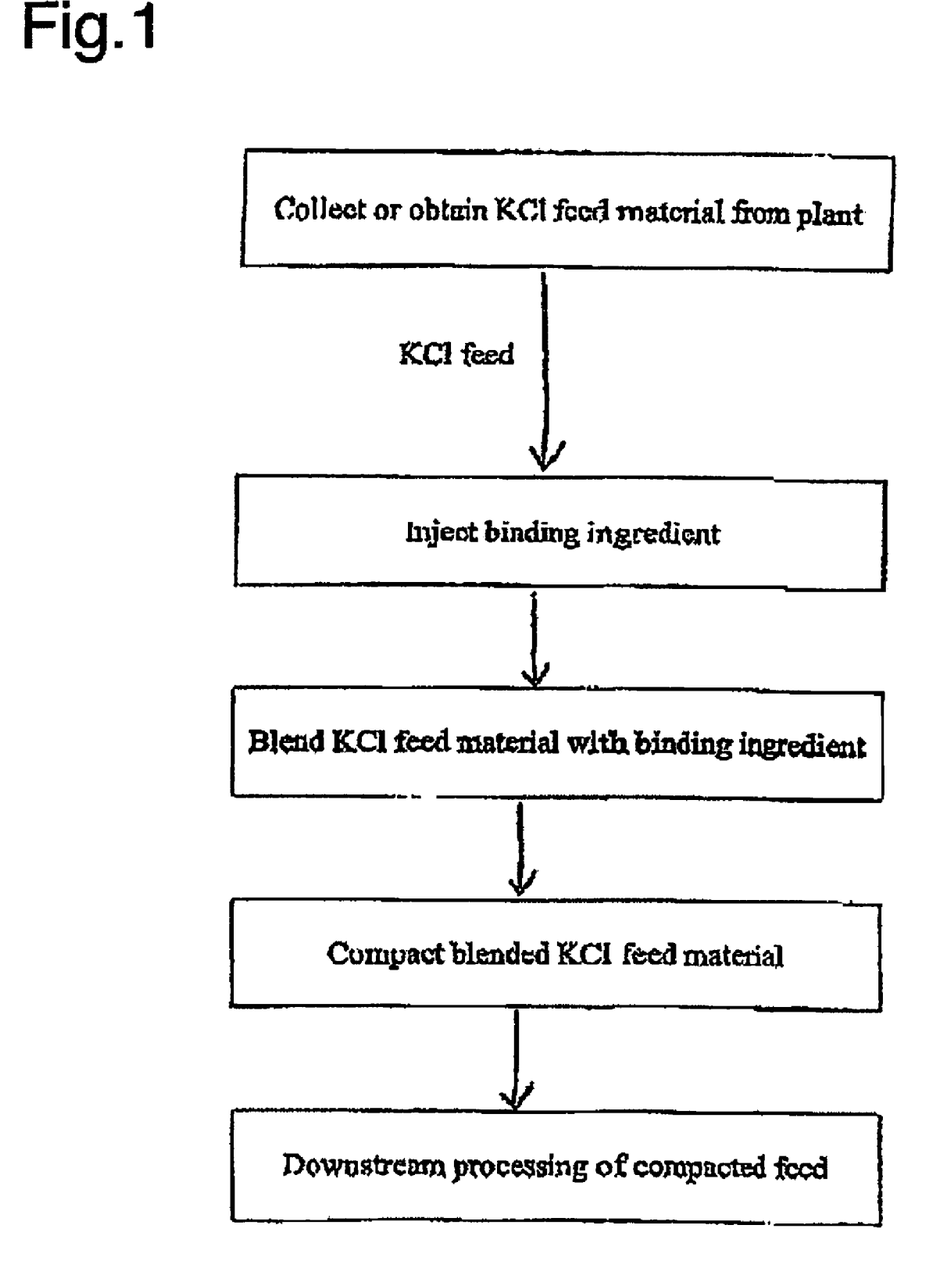
FIG. 1 is a flow chart demonstrating one embodiment of the method of the present invention.

FIG. 1 is a flow chart illustrating the steps involved in one contemplated embodiment of the method of production of the present invention. Specifically, FIG. 1 shows the injection of a binding agent into the potassium chloride (KCl) feed of a typical production circuit. The binding agent or agents could be added to the potassium chloride feed material by an injector. The injector may also include some type of metering equipment, such as those discussed in further detail with respect to the proposed apparatus of the present invention below, to allow more precise control of the amounts of binding agent added per unit of potassium chloride feedstock.

After addition of the binding agent to the potassium chloride feed material, the agent and the potassium chloride feed material are blended. The blending step can either take place passively, by basically allowing these materials to come together or blend during their joint carriage through the feed mechanism, or alternatively there may be specific blending equipment added to the potassium chloride production circuit between the injector and the compactor to provide more aggressive or active blending of the binding agent and potassium chloride feedstock prior to compaction.

The blended potassium chloride feed material, now properly mixed with the chemical binding agent or agents, is then compacted. The compaction process can be performed using conventional compaction equipment such as a roll compactor or the like. The rolled or compacted intermediate yielded can then be further processed into the desired finished granular product using methods such as crushing, sieving or other conventional methods suitable to yield a finished product of the desired particle size or type. These steps are also shown in the flow diagram of FIG. 1.

It might in certain circumstances be desirable to use more than one different binding agent in combination, and this could either be accomplished by the injection of a pre-blended combination of multiple binding agents or else by the separate placement or injection of the desired amounts of the various binding agents into the potassium chloride feed. It will be understood that any attendant process or equipment modifications to permit the addition of one or more binding agents, either concurrently or separately, to the potassium chloride feedstock are contemplated within the scope of the present invention.

Production Apparatus

Various types of apparatus can be contemplated which will accomplish the method of the present invention. An injector needs to be provided to introduce the desired amount of the binding agent or agents into the potassium chloride feed of the production circuit in advance of compaction. It may optionally be desired to provide a blending apparatus as well once the binding agent has been introduced to completely combine the potassium chloride feed material with the binding agent in advance of compaction. Various alterations or modifications could be made to this basic concept to extend its functionality or tailor its use to particular production environments, some of which will be discussed herein and all of which are obvious to one skilled in the art and are contemplated within the scope of the present invention.

In basic embodiments, we could rely upon passive blending of the potassium chloride feedstock and the injected binding agent(s) within the potassium chloride feed in advance of the compactor. If there is sufficient length in the potassium chloride feed, and depending upon the type of feed equipment being used (for example in a pneumatic delivery system), the potassium chloride feed material may be adequately blended with the added binding ingredient(s) without the use of any particular additional or specific blending equipment. However, depending upon the type of conveyor or feed system being used, as well as the typical profile of the potassium chloride feed stock and the type of injection equipment used to add the SHMP or other binding agent to the potassium chloride feedstock, it may also be desirable to provide a blending vessel or other blending equipment between the point of injection of the binding agent and the point of compaction. Both types of systems, with and without a specific blending vessel, will be explained further herein.

Figure 2:
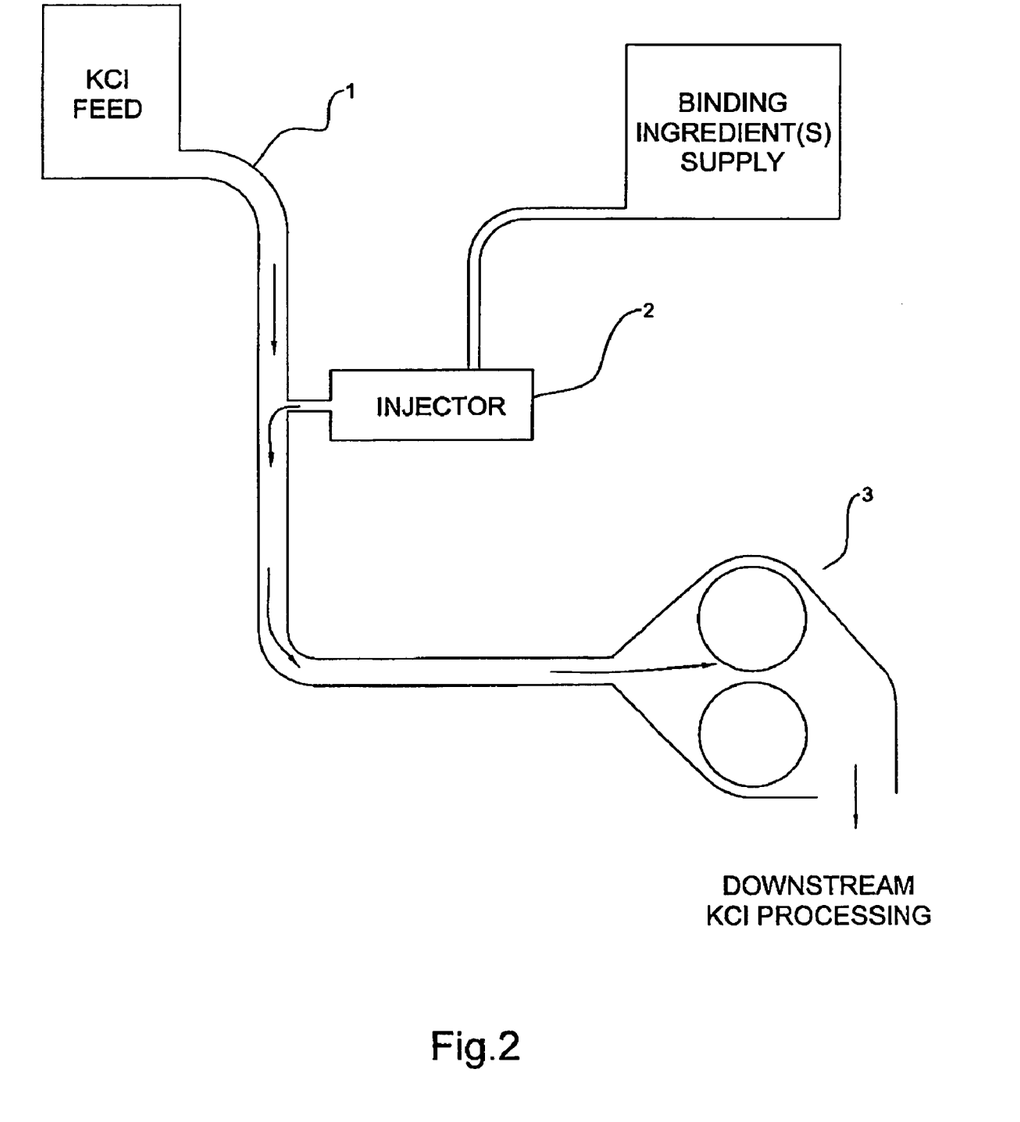
FIG. 2 is a schematic diagram of one embodiment of a compaction feed process circuit of the present invention, using only passive blending in the potassium chloride feed system.

FIG. 2 demonstrates one schematic of a compaction feed process circuit in accordance with the present invention. In this system a pneumatic feed system is used between the injector and the compactor, which could provide for adequate passive agitation or blending of the SHMP or other binding agent and the potassium chloride feed stock in advance of compaction. Agitators might also be used inside of the pneumatic conduits to provide a more aggressive blending behavior if required.

In any event, the potassium chloride feed 1 can be seen in FIG. 2. This would be the potassium chloride feed from the remainder of the processing plant, or from the storage point where potassium chloride feedstock is aggregated for eventual compaction processing. The delivery system might comprise a belt conveyor or pneumatic delivery system, or other type of delivery apparatus that would accomplish the objective of moving potassium chloride feedstock along the production circuit. In this particular case it is contemplated that this might be a pneumatic system that would cause product feed blending without additional blending equipment or vessels.

Shown next in FIG. 2 is an injector 2. This injector 2 would be any type of apparatus capable of dispensing a desired amount of the binding agent in question into the potassium chloride feed 1. It is contemplated that the injector 2 would need to include a metering function in order to adjust the rate of addition of binding agent, as the volume or other characteristics of potassium chloride feed material in the potassium chloride feed 1 were varied. Alternatively, if the feed rate of the potassium chloride feed 1 were constant, a simpler injector could be used for placement of the binding agent. In any event, any injector which can accomplish the objective of placement of the requisite amount of SHMP or other binding agent into the potassium chloride feed 1, and maintain the desired proportion of binding agent, is contemplated within the scope of the present invention.

The injector 2 will place the desired amount of the selected binding agent or ingredients in to the potassium chloride feed 1 of the compaction circuit. The potassium chloride feedstock and the placed binding agent will be blended within the potassium chloride feed 1 between the point of entry from the injector 2 and the point of termination of the potassium chloride feed 1 at the entry to the compactor 3. As mentioned above, in a pneumatic system the blending of the potassium chloride feed might be assisted by the provision of fluting or the like inside of the pneumatic conduits. More aggressive blending might be accomplished by the addition of specific blending equipment at this stage in the compaction circuit if desired.

The blended potassium chloride feed material will be compacted in a compactor 3, and upon discharge from the compactor 3 the compacted potassium chloride intermediate (in the form of a sheet or cake) will be conventionally processed into the desired finished granular product.

Figure 3:
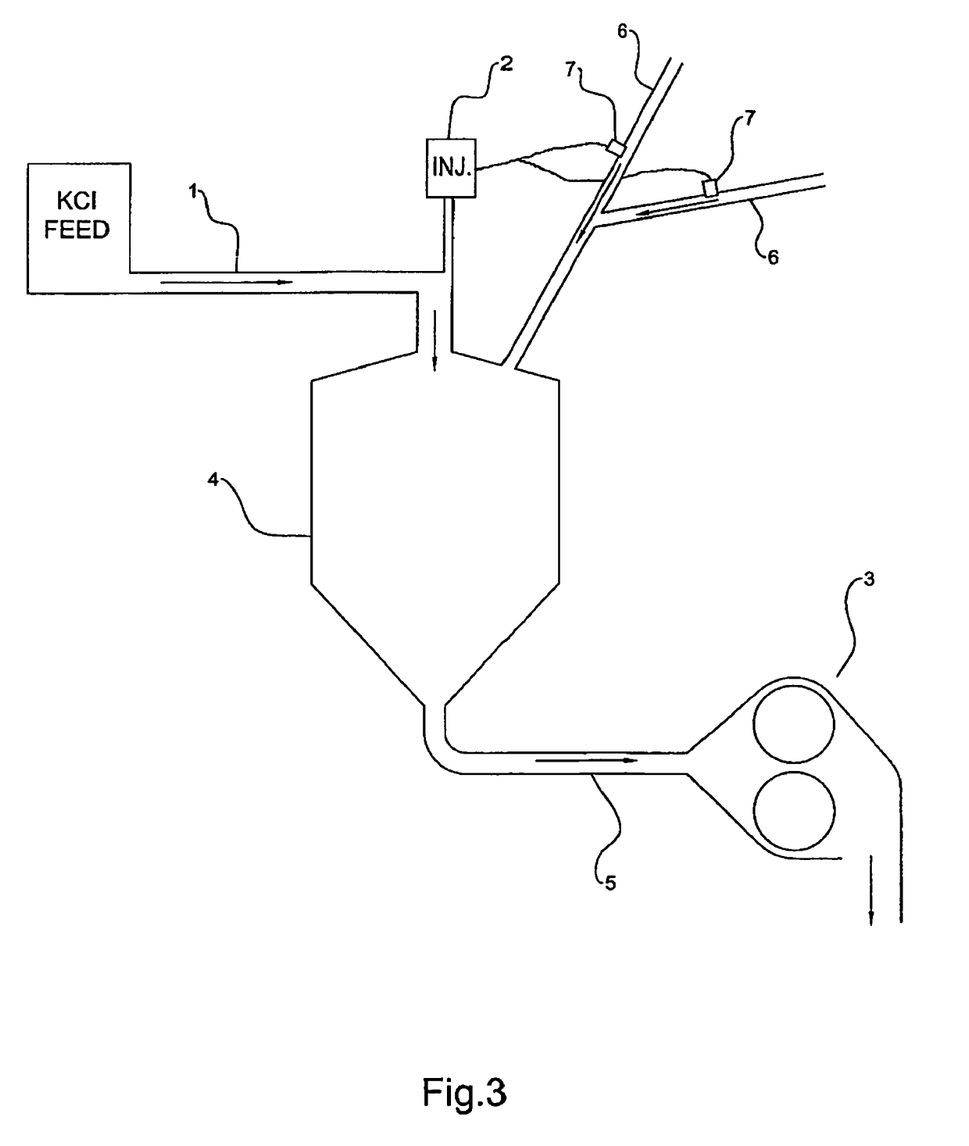
FIG. 3 is a schematic diagram of an alternative embodiment of compaction feed process circuit of the present invention, including active blending equipment in the potassium chloride feed in advance of the compactors.

FIG. 3 shows an alternative apparatus in accordance with another embodiment of the present invention. The difference between the apparatus of FIG. 2 and that of FIG. 3 is that in the apparatus of FIG. 3 a specific blending vessel 4 has been added to specifically blend the potassium chloride feed material and the placed amount of the binding agent.

Shown again in FIG. 3 is a potassium chloride feed 1, which in this case might be a belt conveyor or some other type of a feed that will produce sufficient blending of the potassium chloride and the binding agent in advance of compaction. The injector 2 again would be a device capable of dispensing the desired or appropriate amount of the selected binding agent or agents into the potassium chloride feed 1. In the case of a belt conveyor, the injector could place the binding agent on top of the potassium chloride carried on the belt and the binding agent would move down through the potassium chloride as the two moved toward the compactor and thus blend with the potassium chloride. It may be desired to further blend the two in advance of introduction of this combined material into the compactor 3. As such there is shown a blending vessel 4 into which the potassium chloride feed 1 is discharged, and from which the blended potassium chloride and binding agents are dispensed in turn to the compactor 3, in this case by another conduit or conveyor 5. It will be understood that various types of blending vessels or equipment 4 could be used but that any type of equipment that would accomplish the objective of sufficiently amalgamating the potassium chloride and binders in advance of compaction are contemplated within the scope of the present invention.

A plurality of potassium chloride feeds from different points in the plant might also feed into the blending vessel 4 which would allow for the injection of binding agents into only one of the potassium chloride feeds 1 for simplicity in function without requiring the consolidation of the various potassium chloride feeds 1 at any point in advance of the blending vessel 4 or other consolidation point in advance of compaction. For the sake of demonstration of this concept, there are shown two supplemental potassium chloride feeds 6, which feed into the blending equipment 4. The supplemental potassium chloride feeds 6 in this case do not include separate injectors. They simply feed additional potassium chloride feed material from elsewhere in the plant into the blending vessel 4. The supplemental potassium chloride feeds 6 might be equipped with sensors or metering equipment 7 which can be connected to the injector 2 on the primary potassium chloride feed 1, so that the amount of the binding agent which is dispensed is adjusted accordingly to be the right amount for the aggregated potassium chloride feed volume going into the blending vessel 4 from the various feeds 1, 6.

In this case the sensor equipment 7 is shown which could transmit quantity data from the various supplemental feeds 6 to the injector 2 on the primary feed 1 for the purpose of calculating the proper inclusion rate of the binding agents by the injector 2, but again it will be understood that various methods of applying the proper amount of the binding agent or agents at the injector 2 can be contemplated, including a fixed volume or rate limitation on the supplemental feeds 6 so that sensors were not required and these constant volumes could be calculated into the application rates at the injector 2. Another approach would be to put an injector 2 on each supplemental feed 6, which would effectively turn each potassium chloride feed into a primary potassium chloride feed 1.

The blending vessel 4 might be any kind of tank or hopper or more active blending equipment, which would accomplish the objective of mixing the potassium chloride feed material, and the injected binding agent or agents, in advance of compaction. All such equipment and attendant system modifications are contemplated within the scope of the present invention.

It will also be understood that it might be possible to create an apparatus for the proper placement and blending of the binding agent in the potassium chloride feed right at the point of entry of the potassium chloride feed into the compactor itself, and that this type of an apparatus or approach would also be contemplated within the scope of the present invention.

Another approach rather than the use of specific blending equipment, such as in the embodiment of FIG. 3, might be to place the injector 2 at a point in the system where even if the conveyor or potassium chloride feed system being used were not sufficiently aggressive in its blending or mixing ability, there would still be sufficient time or activity within that movement to adequately and passively amalgamate the material in question. For example if the potassium chloride feed were aggregating potassium chloride feed material from various points in the processing plant, placement of the SHMP or other binding agents in the potassium chloride feed at or near the first or initial points of collection might result in sufficient blending activity once additional layers or amounts of potassium chloride feed material were added to the conveyor at other collection points. It will be understood that this type of approach, or an approach that avoids specific blending altogether and allows that to simply take place at the throat or entry of the compactor(s) will also be contemplated within the scope of the present invention.

It will also be understood that where potassium chloride feeds from various points in the plant all converge in the compaction circuit at the compactor, that the placement of the binding agent or agents in one of the potassium chloride feeds for blending at the point of entry to the compactor are also contemplated within the scope of the present invention.

Assessing the Compacted Potassium Chloride Granular Produced

Tests were conducted using sodium hexametaphosphate (SHMP) as the binding agent to be added to the potassium chloride feed to a concentration of about 100 parts SHMP per million parts potassium chloride feed (ppm) to about 1500 ppm. The best results were obtained at SHMP concentrations near the high end, however satisfactory results were obtained at SHMP concentrations of around 500 ppm. It will be understood that other injection rates might be used either with the same binding agent to obtain a desired different result, or a new inclusion rate might also need to be calculated or experimentally derived if a different binding agent or combination of binding agents were used. Such optimization tests would be obvious to those skilled in the art.

A number of samples of compacted potassium chloride product were taken from the production circuit prior to the addition of SHMP, to provide baseline samples against whose characteristics the compacted granular product of the present invention incorporating the SHMP could be assessed. A large batch of the compacted granular product of the present invention, using SHMP as a binding agent added in advance of compaction, was then produced and a number of tests conducted to assess the product of the present invention against the prior art compacted granular product. The following Table 1 demonstrates the overall test results conducted on a number of the samples containing SHMP at various concentrations as indicated:

TABLE 1

Quantitative assessment of the produced Potassium chloride product where SHMP is included as a binding ingredient

| Day | Time (of day) | Total Volatiles | As is | WBkg % | CBkg % | Dust % | SHMP (ppm) |
|---|---|---|---|---|---|---|---|
| 1 | 08:00 | 0.054 | 8.0 | 16.8 | 8.0 | 0.113 | 113.5 |
| 1 | 08:50 | 0.083 | 6.4 | 14.9 | 7.7 | 0.108 | 82.5 |
| 1 | 10:00 | 0.069 | 6.6 | 9.1 | 7.6 | 0.120 | 1168.0 |
| 1 | 10:50 | 0.103 | 7.4 | 8.7 | 7.8 | 0.123 | 1457.0 |
| 1 | 11:40 | 0.079 | 6.8 | 9.4 | 7.4 | 0.105 | 1089.0 |
| 1 | 12:30 | 0.124 | | | | | 511.5 |
| 1 | 13:20 | 0.082 | | | | | 400.5 |
| 1 | 14:10 | 0.125 | 7.5 | 14.7 | 7.4 | 0.116 | 466.5 |
| 1 | 15:00 | 0.169 | | | | | 562.5 |
| 1 | 15:50 | 0.149 | | | | | 434.0 |
| 1 | 16:40 | 0.133 | 7.3 | 11.0 | 7.8 | 0.106 | 496.5 |
| 1 | 17:30 | 0.127 | | | | | 514.5 |
| 1 | 18:20 | 0.077 | | | | | 584.5 |
| 1 | 19:10 | 0.126 | 7.3 | 14.3 | 6.7 | 0.104 | 582.5 |
| 1 | 20:00 | 0.157 | | | | | 533.0 |
| 1 | 20:50 | 0.125 | | | | | 465.0 |
| 1 | 21:40 | 0.125 | 8.0 | 14.0 | 7.5 | 0.132 | 524.5 |
| 1 | 22:30 | 0.139 | | | | | 712.0 |
| 1 | 23:20 | 0.139 | | | | | 845.5 |
| 2 | 00:10 | 0.146 | 7.6 | 15.1 | 6.3 | 0.107 | 539.0 |
| 2 | 01:00 | 0.141 | | | | | 595.5 |
| 2 | 01:50 | 0.148 | | | | | 559.0 |
| 2 | 02:40 | 0.123 | 7.5 | 14.2 | 7.3 | 0.120 | 630.0 |
| 2 | 03:30 | 0.137 | | | | | 609.0 |
| 2 | 04:20 | 0.131 | | | | | 802.0 |
| 2 | 05:10 | 0.118 | 8.3 | 13.9 | 8.5 | 0.126 | 591.0 |
| 2 | 06:00 | 0.133 | | | | | 627.5 |
| 2 | 06:50 | 0.115 | | | | | 662.0 |
| 2 | 07:40 | 0.145 | | | | | 680.0 |
| 2 | 08:30 | 0.151 | | | | | 639.5 |
| 2 | 09:20 | 0.169 | | | | | 629.5 |

The data in Table 1 were further analyzed as follows.

Weathered Breakage Analysis

Figure 4:
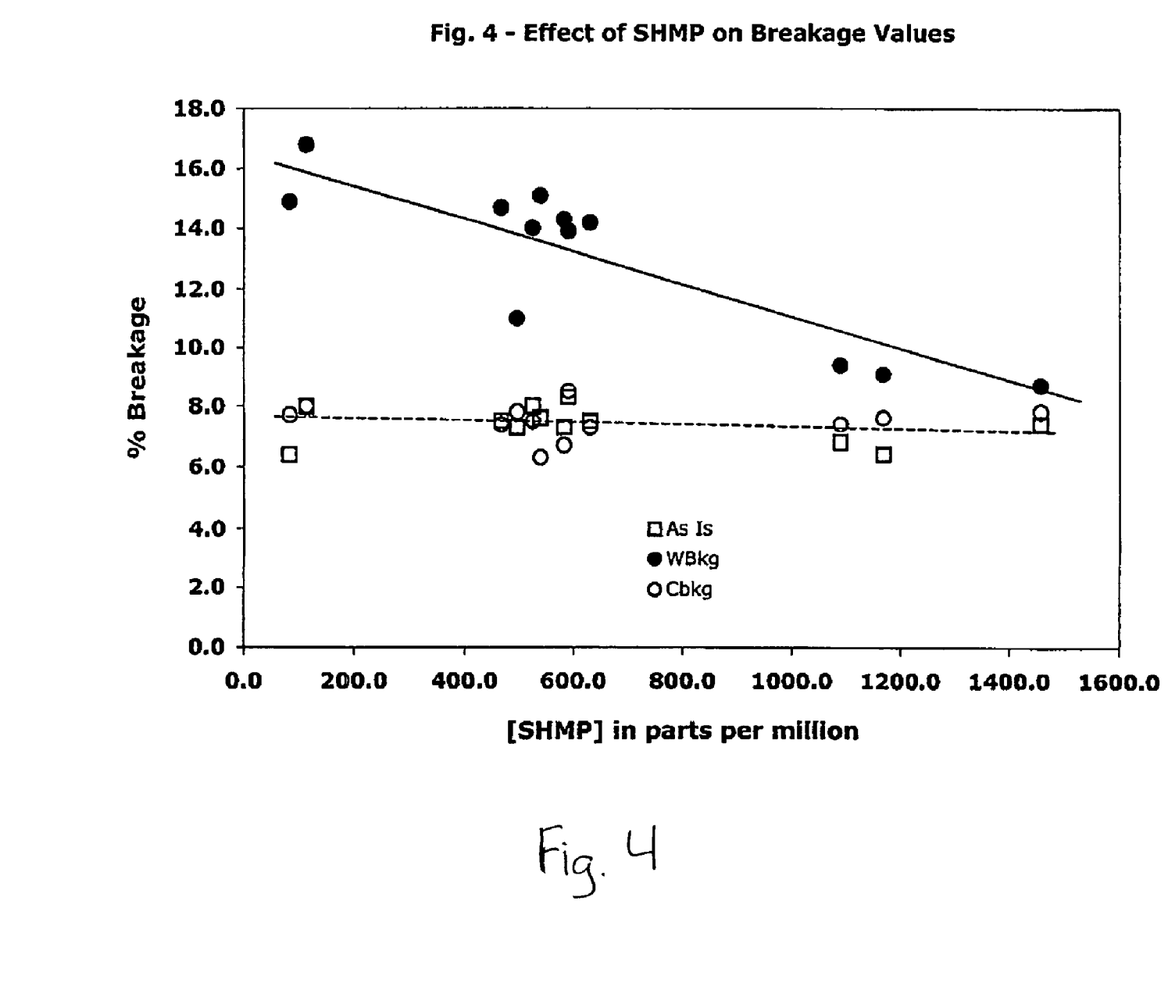
FIG. 4 shows the effect of SHMP concentration on a series of breakage parameters in samples of a finished potassium chloride product.

Several analyses were conducted on the recovered samples. The Dusterbeck Breakage System consisting of "As Is Breakage", "Conditioned Breakage (CBkg)" and "Weathered Breakage (WBkg)" values are IMC laboratory test measures used to evaluate the relative hardness of potash product of the present invention. The "As Is" test is performed on finished product immediately after the sample is taken. The CBkg test is performed after the finished product has been subjected to a 26% relative humidity (RH) environment for 24 hours. The WBkg test is performed after the finished product has been subjected to a 72% RH environment for 24 hours. A WBkg analysis was conducted on the produced granular product that included SHMP. The results of that analysis are shown in FIG. 4.

The results indicate that breakage was highest in the untreated baseline samples and decreased when SHMP was added as a binding agent. The lowest WBkg values (data points 3,4,5 from Table 1) were coincident with the highest concentrations of SHMP. The data show that the inclusion of SHMP as a binding ingredient, in accordance with the method of the present invention, improves the durability of the end product as evidenced by the reduction in WBkg values.

Analysis of Production Volatiles and Dust

Figure 5:
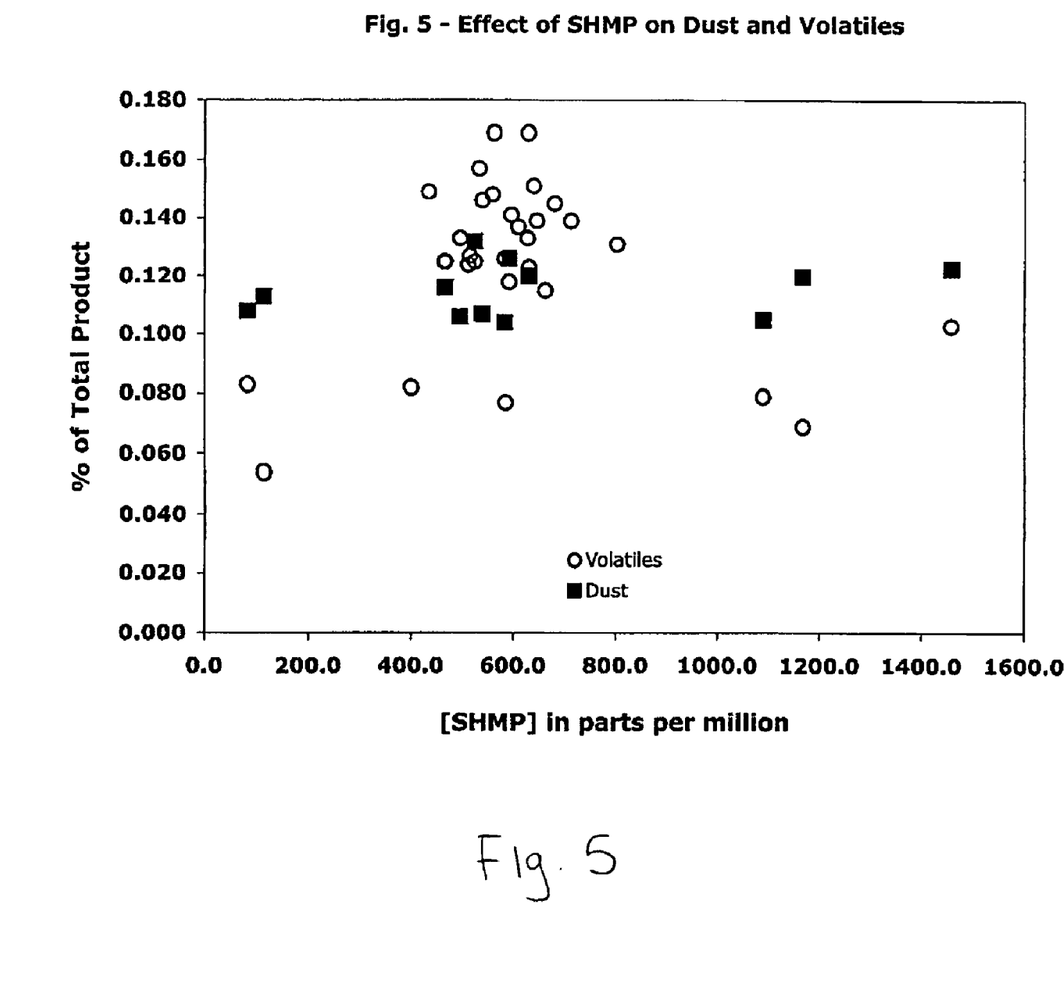
FIG. 5 shows the effect of SHMP concentration on production volatiles and the amount of dust present in samples of a finished potassium chloride product.

The quantity of volatiles in various samples was also assessed. The results of the volatile testing are shown in FIG. 5. The results indicate that SHMP addition has no effect on total volatiles production. Likewise, the results also indicate that SHMP addition had no effect on the proportion of dust present in the samples.

Product Reclaim Analysis

A number of rail cars were loaded with the newly compacted product, and reclaim samples obtained during the loading of these cars. The term reclaim sample here refers to product that has been transferred from warehouse storage to the refinery and re-screened prior to oil treatment. Typical reclaim breakage values for aged product produced without SHMP are as high as 25-30%. To determine if the addition of SHMP reduces the amount of reclaim product breakage, samples produced with SHMP were analyzed as follows:

TABLE 2

Reclaim Analyses

| Time of Day | Total Volatiles (%) | Shipment Weathered Breakage (%) | [SHMP] (ppm) |
|---|---|---|---|
| 10:00 | 0.0579 | 16.06 | 731 |
| 10:15 | 0.0647 | 13.17 | 665 |
| 10:30 | 0.0607 |  | 549 |
| 10:45 | 0.0785 |  | 613 |
| 11:00 | 0.0814 |  | 551 |
| 11:15 | 0.0674 | 14.04 | 534 |
| 11:30 | 0.0743 | 14.67 | 589 |
| 11:45 | 0.0804 |  | 650 |
| 12:00 | 0.0755 |  | 704 |
| 12:15 | 0.1382 |  | 648 |
| 12:30 | 0.1086 |  | 559 |

The results indicate that shipment weathered breakage averaged 14% for Granular reclaim product. Granular potassium chloride reclaim product, displaying breakage values below 20%, is considered to be good quality product.

Shipment Analysis

Five test cars were loaded with the SHMP test product, to determine whether SHMP prevented damage during loading and shipping. The results from shipment analyses are shown in Table 3 as follows:

TABLE 3

Shipment Analyses

| | Ticket | | | | |
|---|---|---|---|---|---|
| | 397090 | 397091 | 397092 | 397093 | 397094 |
| Loading Analyses | | | | | |
| Total Volatiles (%) | 0.19 | 0.18 | 0.19 | 0.17 | 0.17 |
| Weathered Breakage (wt %) | 13.01 | 14.05 | 13.95 | 13.42 | 12.95 |
| Conditioned Breakage (wt %) | 3.32 | 2.97 | 3.27 | 3.23 | 3.49 |
| Dust (%) | 0.01 | 0.01 | 0.01 | 0.02 | 0.02 |
| Oil (lb/ton) | 2.5 | 2.18 | 2.21 | 2.11 | 1.97 |
| SHMP (ppm) | 649 | 522 | 493 | 595 | 818 |
| Tyler Mesh Sieve | | | | | |
| 6 | 14.5 | 28.5 | 24.52 | 21.1 | 28.4 |
| 8 | 60.9 | 73 | 74.04 | 67.2 | 74.8 |
| 10 | 92.2 | 96.6 | 95.59 | 94.4 | 96.7 |
| 12 | 97.7 | 99.5 | 98.49 | 98.7 | 99.5 |
| 14 | 98.6 | 99.7 | 99.13 | 99.3 | 99.8 |
| 20 | 99.3 | 99.9 | 99.48 | 99.7 | 99.9 |
| 35 | 99.8 | 99.9 | 99.78 | 99.9 | 99.9 |
| Analyses After 3 Weeks | | | | | |
| Weathered Breakage (wt %) | | 14.1 | | 13.4 | |

The results indicate that shipment weathered breakages were 13-14% for product treated with SHMP at about 500 ppm to about 800 ppm, and even after three weeks of storage, breakages remained at 13-14%. As breakage values below 20% are considered to indicate a good quality product, SHMP was effective in maintaining the quality of a finished compacted granular potassium chloride product produced by the method of the present invention. Conditioned breakage and dust results gave typical conventional values when compared to historical shipment data.

Figure 6:
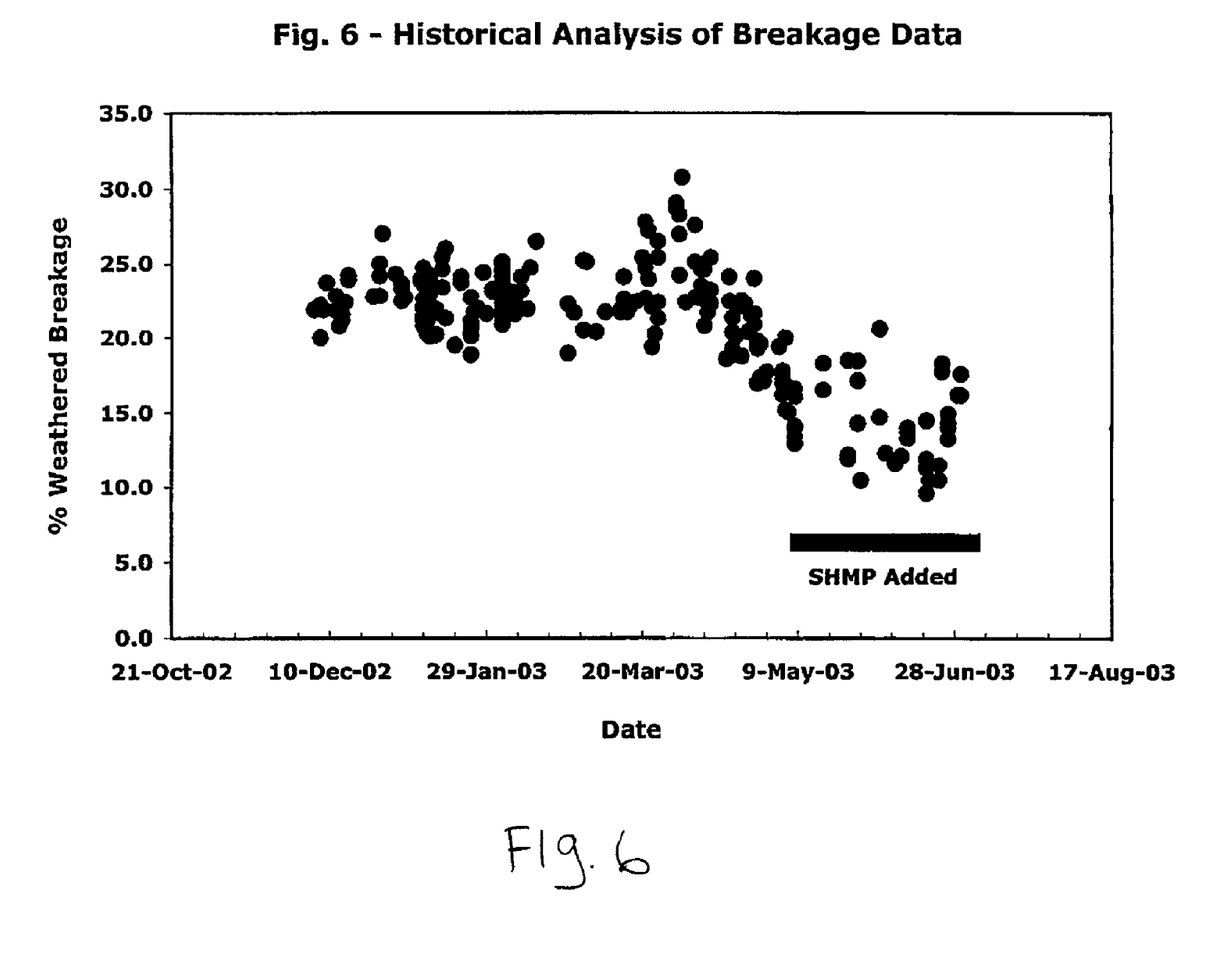
FIG. 6 shows historical data of shipment weathered breakage analysis before and after adding SHMP to the feedstock.

Comparisons of shipment weathered breakage measurements were made for compacted granular product produced before and after SHMP was utilized in the production of compacted granular potassium chloride. The results are shown in FIG. 6. The results indicate that reduced levels of Shipment Weathered Breakage have been achieved as a result of including SHMP as a binding agent in the production circuit. Prior to the inclusion of SHMP in the compaction process, granular product was produced that showed breakage levels in a range from 15.0-30.8%, with an average of 22.4+/−4.8% In contrast, since the inclusion of SHMP in the production circuit, breakage levels have been in a range from 9.6-20.6%, with an average of 14.3+/−5.3%. This is a significant improvement in granular product quality brought about by the addition of a binding agent prior to compaction.

Accordingly, in a preferred embodiment of the present invention, an effective amount of the SHMP binding agent added to a potassium chloride feedstock to produce a blended potassium chloride product with improved handling, transport and storage capabilities is in the range from 100 ppm to 1500 ppm, preferably in the range from 300 ppm to 1000 ppm, and more preferably in the range from 500 ppm to 800 ppm. The potassium chloride product containing the SHMP binding agent preferably has an average shipment weathered breakage of less than 20%, and more preferably less than 15%.

The foregoing is considered as illustrative only of the principles of the invention. Furthermore, since numerous changes and modifications will readily occur to those skilled in the art, it is not desired to limit the invention to the exact construction and operation shown and described. Accordingly, all such suitable changes or modifications in the structure or operation that may be resorted to in order to accomplish the objective of yielding a compacted granular potassium chloride product including a binding ingredient to improve the strength and handling quality thereof are intended to fall within the scope of the claimed invention.

The invention claimed is:

1. A method for the production of compacted granular potassium chloride with improved handling, transport and storage capabilities comprising:
    adding an effective amount of sodium hexametaphosphate (SHMP) in a range from 300-1500 ppm to a potassium chloride feedstock;
    mixing the SHMP and the potassium chloride feedstock to produce a blended mixture;
    compacting the blended mixture in a compaction process to produce a compacted potassium chloride product; and
    processing the compacted chloride product to produce a granular potassium chloride product;
    wherein the effective amount of SHMP is added to the potassium chloride feedstock to produce the granular potassium chloride product that undergoes an average shipment weathered breakage of less than 20%.

2. The method of claim 1, wherein an effective amount of SHMP is greater than 400 ppm.

3. The method of claim 1, wherein the effective amount of SHMP is in the range from 500-800 ppm.

4. The method of claim 3, wherein the effective amount of SHMP is added to the potassium chloride feedstock to produce the granular potassium chloride product that undergoes an average shipment weathered breakage of less than 15%.

5. The method of claim 1, wherein the SHMP is continuously added to a potassium chloride feedstock in a compaction feed process.

6. The method of claim 1, wherein the SHMP and potassium chloride feedstock are mixed in a blending vessel prior to the compaction feed process.

7. The method of claim 1, wherein a plurality of potassium chloride feedstocks are simultaneously blended with the SHMP in a single mixture.

* * * * *